(12) United States Patent
Dam

(10) Patent No.: US 6,283,409 B1
(45) Date of Patent: Sep. 4, 2001

(54) SAIL CLOSURE MECHANISM FOR CROSS BAR ACCESS DEPLOYABLE WING

(75) Inventor: Dennis Van Dam, Chattanooga, TN (US)

(73) Assignee: USBI Co., Kennedy Space Center, FL (US)

( * ) Notice: Subject to any disclaimer, the term of this patent is extended or adjusted under 35 U.S.C. 154(b) by 0 days.

(21) Appl. No.: 09/420,260

(22) Filed: Oct. 18, 1999

(51) Int. Cl.⁷ ....................................................... B64C 3/56
(52) U.S. Cl. ................................................................ 244/49
(58) Field of Search ...................... 244/13, 16, 900–901, 244/49, 139, 138 R, 145, 140, 141, 142

(56) References Cited

U.S. PATENT DOCUMENTS

| | | |
|---|---|---|
| 5,474,257 * | 12/1995 | Fisher et al. ............................ 244/49 |
| 5,878,979 | 3/1999 | Fisher et al. . |
| 5,884,863 | 3/1999 | Fisher et al. . |

* cited by examiner

*Primary Examiner*—Galen L. Barefoot
(74) *Attorney, Agent, or Firm*—Norman Friedland

(57) ABSTRACT

The openings in the fabric ribs of a deployable wing made from fabric sail material is automatically closed by use of a zipper mounted adjacent each of the openings that is actuated by movement of the cross spars of the deployable wing which serves to prevent the airfoil surface to the wing to bulge and cause a drag to the deployable wing when in flight.

3 Claims, 3 Drawing Sheets

SAIL CLOSURE MECHANISM FOR CROSS BAR ACCESS DEPLOYABLE WING

TECHNICAL FIELD

This invention relates to a glider and particularly of the deployable wing type and the mechanism for closing the access cut-out of the rib to allow the cross bar to translate so as to avoid protrusions in the airfoil of the sail of the wing when deployed.

BACKGROUND OF THE INVENTION

This invention constitutes an improvement over U.S. Pat. Nos. 5,474,257 and 5,878,979 granted on Dec. 12, 1995, to Fisher et al, entitled Deployable Wing and Mar. 9, 1999, to Fisher et al, entitled Method and Apparatus for Landing a Wing, respectively. The patentees of these two patents are the same joint inventors of the invention covered in the above-captioned patent application and this application and these two patents are commonly assigned and both patents are incorporated herein by reference. These patents relate to deployable wings that are designed to carry a payload remote from the an air dropoff and for details of its construction reference should be made thereto. Suffice it to say that the common subject matter relates to deployable wing that comprises internal structure that is folded in a compact package that is airlifted by aircraft to an approximate destination and thereafter released and through the advent of sequentially operated parachutes is caused to deploy into a wing that is formed from a lower and upper delta shaped sail that is bounded at the edges to form an airfoil shaped enclosure. An opening at the forward center of the wing admits air to internally to fill the pocket defined by the lower and upper sails and expand the airfoil of the glider. The internal structure includes divergent leading edge spars attached to a central keel and a pair of diametrically opposed cross spars that when stored are folded into a relatively in-line or parallel position and when deployed the leading edge spars and cross spars extend perpendicular to the keel to form essentially a delta wing. Typically, after the glider is dropped from the aircraft parachutes are deployed and causes a slider to translate which, in turn, causes the cross spars that are pivotally attached to a sliding mechanism and each of the leading edge spars to translate and move angularly relative to the keel. The ram air then causes the wing to inflate, and once the glider is fully deployed these parachutes are disengaged from the wing and the glider begins its forward flight to its guided destination. The mechanism for performing these functions are detailed in U.S. Pat. No. 5,474,257 and for further details reference should be made thereto.

An internal heavier fabric is sewn to the lower sail and forms a portion thereof and extends to the upper sail and is sewn to define a protective pocket for the leading edge spars. A plurality of ribs formed from fabric is sewn to the upper sail and lower sail and extends from the forward to the aft end of the internal fabric. These ribs are equally spaced and extend across the cross spar. Obviously, a slot is formed in the ribs to allow the transition of the cross spar from the stored position to the deployed position, The length of the slots is sufficient to allow the cross spars to move the distance required to deploy the wing. The slot is say, approximately 12 inches and in the heretofore designs the slot remained unaltered and, hence, opened. Although the opened slot is internal, the effect of this opening causes bulges in the airfoil on the upper and lower sails adjacent to these openings when the wing is extended due to the external and internal air pressure acting on the wing. These bulges or protrusion in the sail are a source of drag and adversely affect the efficiency of the wing.

The purpose of the present invention is to solve this bulging problem and hence, alleviate a condition on the airfoil that adversely impacts the flight thereof. We have found that by employing a zipper and the mechanism for causing the zipper to close and eliminate the slot the problem of the opened slot is alleviated or at least minimized.

SUMMARY OF THE INVENTION

An object of this invention is to provide an improved deployable wing by eliminating the slot that permits the cross spar to translate and deploy the leading edges and wing of the deployable wing.

A feature of this invention is to provide a plurality of closure material and zippers that are formed in the rib portion of the sail fabric at locations where the cross bar slides under the otherwise cutout of the ribs in the location where the bulging in the deployed airfoil occurs and mechanism to actuate the zipper to enclose the space that permits the passing of the cross bar when being deployed.

The foregoing and other features of the present invention will become more apparent from the following description and accompanying drawings.

These figures merely serve to further clarify and illustrate the present invention and are not intended to limit the scope thereof.

DETAILED DESCRIPTION OF THE INVENTION

Figure 1:
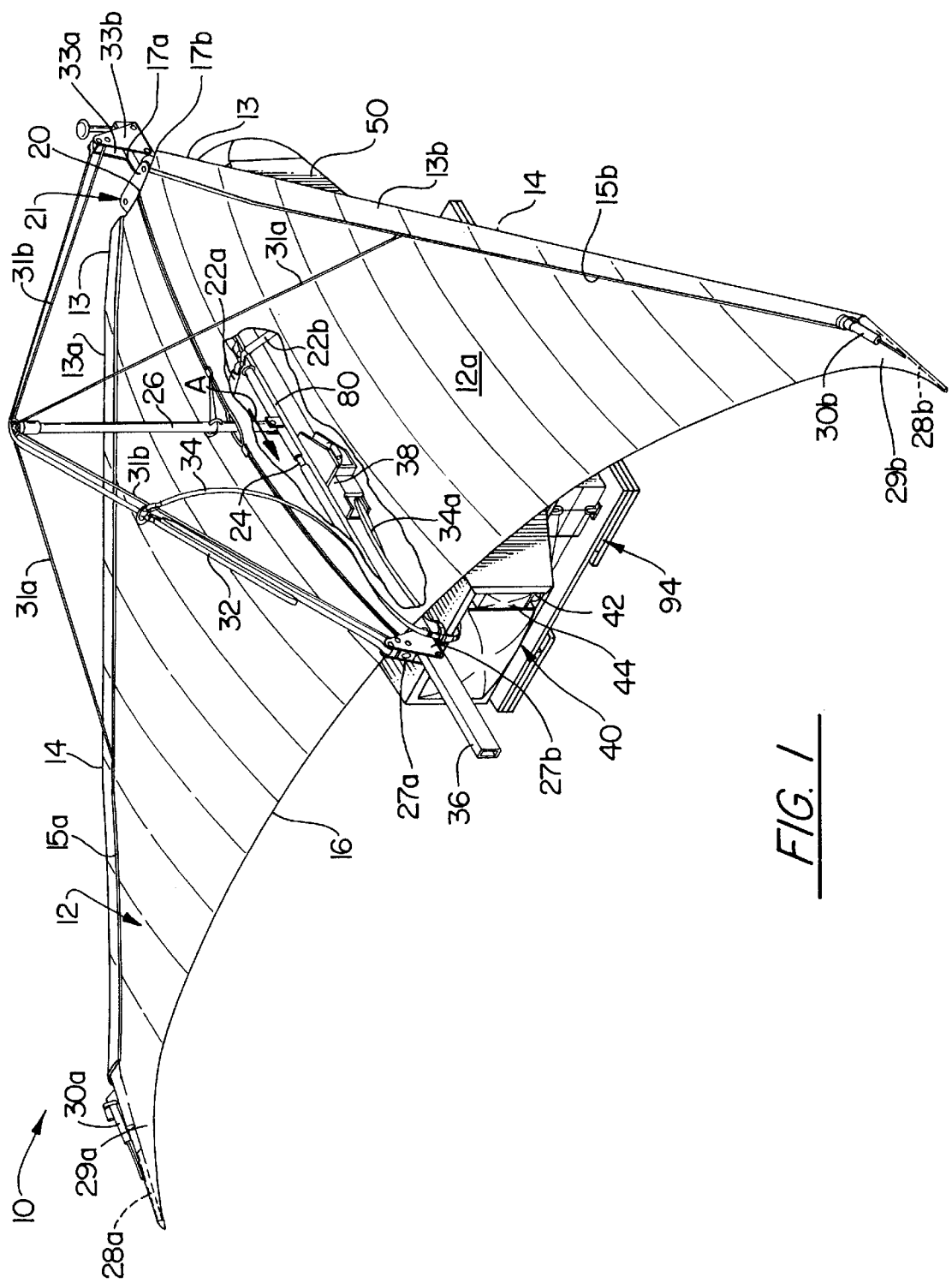
FIG. 1 is a perspective view, partly broken away, of the prior art deployable wing depicting the effect of the bulging when the wing is airborne and modified to incorporate this invention.
Figure 2:
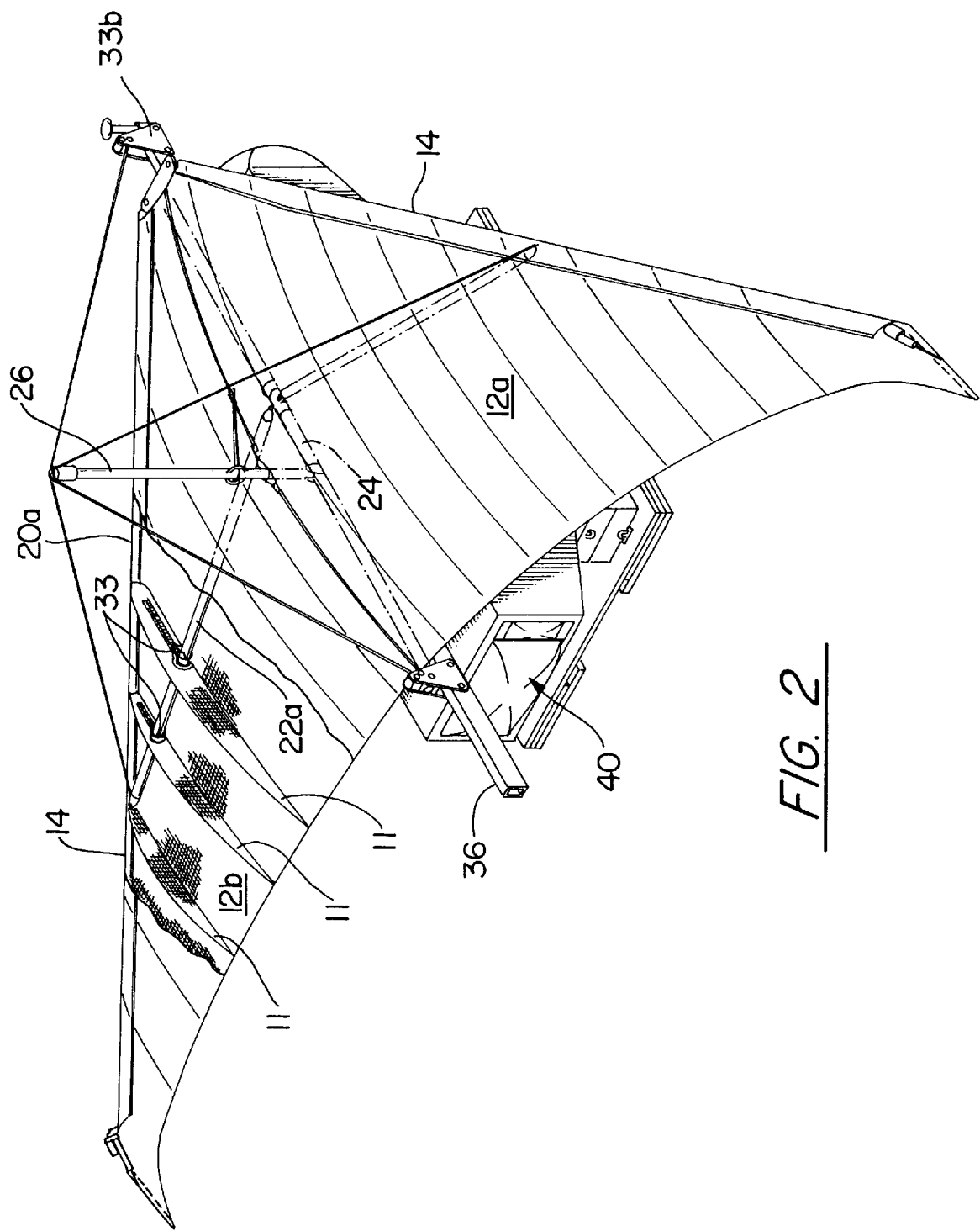
FIG. 2 is a diagrammatic view in schematic illustrating the details of this invention.

Referring now in specific detail to the drawings, with like reference numerals identifying similar or identical elements, FIG. 1 illustrates a perspective view, partially broken away, of one embodiment of the deployable wing 10 of the present application. As illustrated in FIG. 1, wing 10 includes a fabric sail 12 defining a leading edge 14 and a trailing edge 16. Fabric sail 12 preferably includes an upper section 12a substantially joined along its perimeter to a lower section (not shown) and a plurality of fabric ribs (not shown) connected to the upper and lower sections of the fabric sail. Joining the upper and lower sections forms an envelope which can be filled with air through a ram air intake 20 preferably located at the foremost point of the wing. In the present embodiment fabric sail 12 further includes an integral cover sheet 13 comprising a first section 13a and a second section 13b, each of which is disposed along the leading edge of wing 10 as shown in FIG. 1. First and second sections 13a, 13b each further include complimentary zipper members 15a, 15b which matingly engage in a conventional manner to contain fabric sail 12 within the integral cover as described hereinbelow. In the present embodiment cover 13 is preferably made of DACRON fabric while zipper members 15a, 15b are of a sufficiently high strength and durability to operate under deployment conditions, although other materials may be utilized depending upon the design configurations of the wing.

With continued reference to FIG. 1, wing 10 further includes an internal structure comprising two leading edge spars (not shown), two cross-spars 22a, 22b, a keel 24, a kingpost 26 and a control device, such as elevon struts 28a, 28b. The leading edge spars are pivotally attached at one end between faceplates 17a and 17b to form foremost point 21. Pivotally connected the leading edge spars at a second end thereof are elevon struts 28a, 28b. Keel 24 is mounted at a first end between faceplates 17a and 17b, and is mounted at an opposite end between rear plate members 27a and 27b and is disposed between the leading edge spars. Cross spars 22a, 22b each include an outboard end which is pivotally attached to a corresponding leading edge spar and further include inboard ends, opposite the outboard ends, which are pivotally attached to keel 24, preferably via a common slider 80. Kingpost 26 is also preferably mounted to keel 24 via the common slider. When erected, kingpost 26 extends substantially perpendicular to keel 24, through an opening in fabric sail 12, to provide an upper attachment point for wires 31a, 31b which support the wing on landing and when the wing experiences negative loads or inverted flight. In the present embodiment kingpost 26 is pivotally attached to slider 32 such that linear movement of the slider in the direction of arrow "A" causes kingpost 26 to erect through the fabric sail, substantially perpendicular to the keel.

The leading edge spars and cross spars are preferably pivotally mounted such that in a closed or pre-deployed position the leading edge spars and cross spars 22a, 22b rest substantially parallel to keel 24. In the closed position the common slider is preferably disposed adjacent the foremost point and kingpost 26 is preferably disposed adjacent and substantially parallel to keel 24, beneath fabric sail 12. In the closed position complimentary zipper members 15a, 15b are matingly engaged in a conventional manner to contain fabric sail 12 within the integral cover. Preferably, the leading edge spars, cross spars, keel, elevon struts, kingpost and wing tips 29a, 29b are all substantially disposed within fabric sail 12 in the closed position.

The length of each leading edge spar is dependent upon the desired size of wing 10, which is only limited by practical considerations: size once folded, desired cruise speed, weight of the payload, etc. Once opened, or deployed, the leading edge spars form an angle therebetween. The size of the angle depends upon aerodynamic considerations including aspect ratio, yaw stability, and deployment simplicity, among others. Typically, the angle ranges from about 90° to about 150° with about 105° to about 110° preferred due to simplicity of the deployment mechanism geometry. Angles greater than about 150° result in more complex, and therefore less desirable, mechanical/structural geometry and decreasing yaw stability, while angles less than about 90∠ result in decreasing glide ratio. Yaw stability is where wing sweep allows the wing to tend to maintain its flight directly into the wind, commonly known as maintaining the yaw heading. As the wing yaws, the windward wing tends to drag more than the leeward wing, thereby correcting for the yaw.

Cross spars 22a, 22b provide structural integrity to the wing 10 by providing strength to the leading edge spars to ensure that in the deployed position the leading spars remain in the open position with the appropriate angle therebetween. The distance between the attachment point of the outboard ends to their respective leading edge spars and the inboard ends to the keel determine the length of cross spars 22a, 22b.

With continued reference to FIG. 1, keel 24 similarly provides structural integrity to wing 10 by ensuing that the wing 10 opens to and maintains its full length from the leading edge 14 to the trailing edge 16, commonly known as the wing's chordwise length. The length of the keel 24 is substantially equivalent to the chordwise length of the wing at the root (very center line) which, as with the leading edge spars' length, is determined on a practical basis with aeronautical considerations effecting the ultimate size. Keel 24 also connects payload 50 to wing 10 via mounting member 42

The present embodiment also includes elevon struts 28a, 28b which are each connected to a motor or fluid actuator 30a, 30b, the actuators being located externally of fabric sail 12 and mounted to the leading edge spars. The motor or actuator is conventional in design and operates to deflect or rotate each elevon struts 28a, 28b independently, out of the plane of the sail, thereby controlling the flight of the wing. By rotating the elevon struts, wing tips 29a, 29b are twisted up or down relative to the leading edge. This helical twisting of the sail results in an aerodynamic force sufficient to pitch or roll the wing. Rotating or deflecting the elevon struts in unison generates an aerodynamic force substantially behind the pressure center of the wing which is located at the point about 55% down the keel from the foremost point 16, thereby forming a moment force about the pressure center which is used for pitch control of the wing. By rotating or deflecting the elevon struts 28a, 28b singularly or in opposite directions, aerodynamic forces at the wing tips 29a and 29b can be controlled in magnitude and direction, up or down. For example, if the elevon strut 28a is rotated up while elevon strut 28b is rotated down, a downward force is generated on tip 29a and an upward force on tip 29b, resulting in a roll or turn in the direction of strut 28a.

These elevon struts 28a, 28b, or other control devices, can be operated with any conventional motor capable of generating sufficient torque to overcome the aerodynamic forces at a speed sufficient for control response. Factors important in determining the required torque include wing area, wing loading, aspect ratio, and elevon strut length, among others. A wing having a 30 foot wing span, for example, with a sail area of about 190 ft$^2$ and a 700 lb load requires about 40 to about 80 ft lb torque while a 15 ft wing span wing with an area of 45 ft$^2$ and a 90 lb load needs about 15 to about 25 ft lb torque for control.

In the present embodiment the length of kingpost 26 is approximately 4 ft. which, as with the keel's and leading edge spars' length, is determined on a practical basis with aeronautical considerations effecting the ultimate size. In addition to providing an upper attachment point for wires 31a, b as described above, kingpost 26 also provides support for strap 32 which is attached at one end between front plate members 33a, 33b, extends over the kingpost and is attached at an opposite end between rear plate members 27a, 27b. Strap 32 is of a sufficient length such that when the strap extends over the kingpost and is strapped between plate members 33a, 33b and 27a, 27b, there is enough slack present in the strap to allow the strap to be pulled free of the kingpost when parachutes 44 deploy.

Attached to strap 32 at approximately its midpoint, in the present embodiment, is parachute attachment line 34. The point at which line 34 attaches to strap 32 is the point at which the wing 10 with cargo pod, or payload 50 will hang substantially horizontal beneath the parachutes without excessive rotation or pitching. Likewise, the length of strap 32 is length at which the payload will hang substantially horizontal beneath the parachutes. Attachment of line 34 to strap 32 is achieved in the present embodiment through loops which are sewn onto strap 32 and line 34 and which are connected by a clevis fitting, though any conventional method of attachment which will allow for parachute deployment may be utilized. Attachment line 34 is joined at an opposite end to parachute deployment system 40 and includes a second line 34a which branches from the attachment line 34 and attaches to a secondary release mechanism disposed within mounting block 38. Mounting block 38 is connected to wing mounting member 36 which is mounted to both keel 24 and payload pod 0, the mounting member thereby attaching the payload to the wing. The secondary release mechanism 39 provides controlled release of a parachute deployment system 40 which is described in greater detail below. The present embodiment may include a platform 94 mounted to the underside of cargo pod 50 which aids in the mounting of the wing in the aircraft and in the landing thereof. An antenna 49 may also be carried on the fore end of the wing 10 for the radio control navigation.

The cutout 13 in rib 11 adjacent the cross tube spar 25a serves to allow the cross tube spar to move axially rearward when the wing is being deployed. As mentioned above, in this area of the airfoil the forces internally of the wing caused the airfoil to bulge creating a drag on the flight of the wing. The invention obviates this problem by adding material 15 to this area of the cutout that complements the cut out portion. A male toothed portion 21 and female toothed portion 23 of the zipper 19 serve to close this cutout when the wing is deployed. This is accomplished by tying the zipper handle 31 of the zipper 19 to the cross tube spar 25a with a cord or string so that when the cross tube spar 25a is deployed the zipper will close in a conventional manner. By closing the cutout, it was observed that the bulges in the airfoil of the wing were eliminated when the wing was deployed and airborne. Obviously, each of the cutouts for each of the ribs accommodating the motion of the cross tube spar 25a will include a similar zippered fabric insert.

Figure 3:
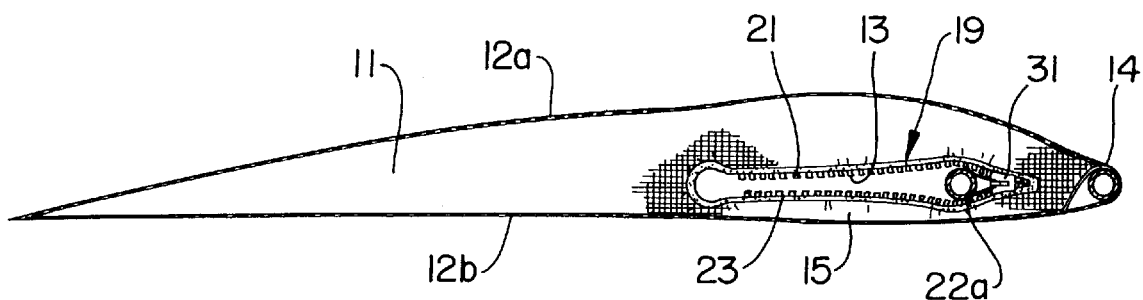
FIG. 3 is a diagrammatic view in schematic illustrating the zippered panel of FIG. 2 in the non-deployed position.
Figure 4:
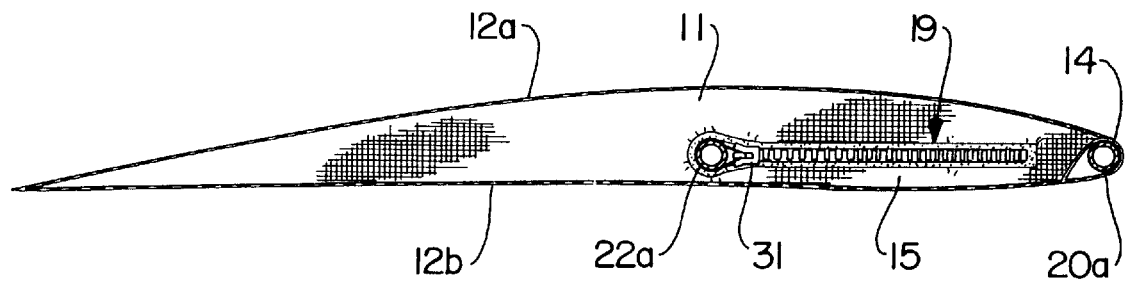
FIG. 4 is a diagrammatic view in schematic of the embodiment depicted in FIG 1. where the zippered panel is in the deployed position.

The operation of the zippered fabric insert is best demonstrated in FIG. 3 and 4 diagrammatically showing the spar moved from one position to the other and the added material with the zippered edge being activated by the movement of the cross tube spar 25a. As noted in FIG. 4 when the wing is completely deployed the cord 33 attached to the cross tube spar 25a and the zipper closure has caused the zipper to substantially close the cutout portion of rib 11 and essentially tie the top sail 12a to the bottom sail 12b through the rib 11.

Although this invention has been shown and described with respect to detailed embodiments thereof, it will be appreciated and understood by those skilled in the art that various changes in form and detail thereof may be made without departing from the spirit and scope of the claimed invention.

It is claimed:

1. A deployable wing comprising, a fabric sail having an upper section and a lower section joined to each other around the peripheral edges thereof, a plurality of laterally spaced ribs between the upper section and lower section attached thereto, an internal structure disposed substantially between said upper section and said lower section, said internal structure including a keel extending fore and aft of said fabric sail, a first leading edge having one end pivotally attached to said keel mounted on one side of said keel and a second leading edge having one end pivotally attached to said keel in the same plane as said other one end, and when deployed said first leading edge and said second leading edge extend from a parallel position relative to said keel to an angularly outward position to define the wing, an opening in the fore end of said fabric sail to admit air between said upper section and said lower section, a first cross spar pivotally attached to said keel and said first leading edge and a second cross spar pivotally attached to said keel and said second leading edge for deploying said wing, openings in said ribs to permit translation of said first cross spar and said second cross spar, a flap formed adjacent to at least some of said openings and a zipper attached to said flap and said rib for closure of said opening and attachment means to said zipper and said first cross spar and said second cross spar to close and open said zipper to allow passage of said cross spar when moved from said deployed to non-deployed position and vice-versa.

2. A deployable wing as claimed in claim 1 wherein a flap is mounted to said opening in each of said ribs where the sail bulges at the airfoil surface of said wing and a zipper and actuated attached to said flap for closure of said opening whereby the protrusion of said bulge is lessened.

3. A deployable wing as claimed in claim 2 including a sheath of fabric mounted around said first leading edge and said second leading edge for supporting said leading edge, said flap being disposed downstream of said first leading edge and said second leading edge relative to said first leading edge and said second leading edge.

* * * * *